May 8, 1956
O. J. OLSON
2,744,434
MULTIPURPOSE POCKET-SIZE HARMONICA
WITH SELECTIVE KEY-CHANGE MEANS
Filed Sept. 8, 1952
6 Sheets-Sheet 1
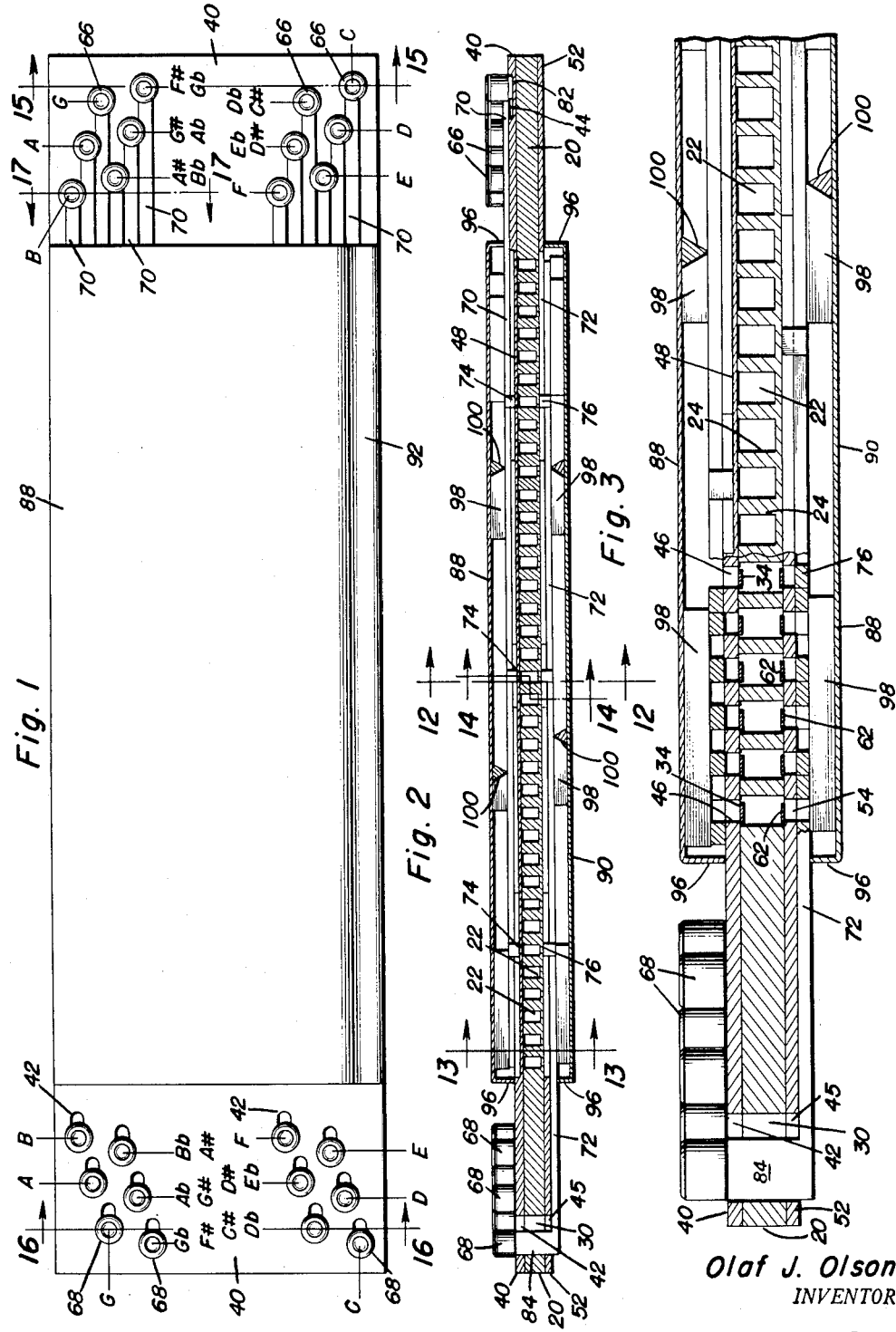
Olaf J. Olson
INVENTOR.
BY Clarence A. O'Brien
and Harvey B. Jacobson
Attorneys May 8, 1956

O. J. OLSON 2,744,434

MULTIPURPOSE POCKET-SIZE HARMONICA
WITH SELECTIVE KEY-CHANGE MEANS

Filed Sept. 8, 1952

Olaf J. Olson
INVENTOR.

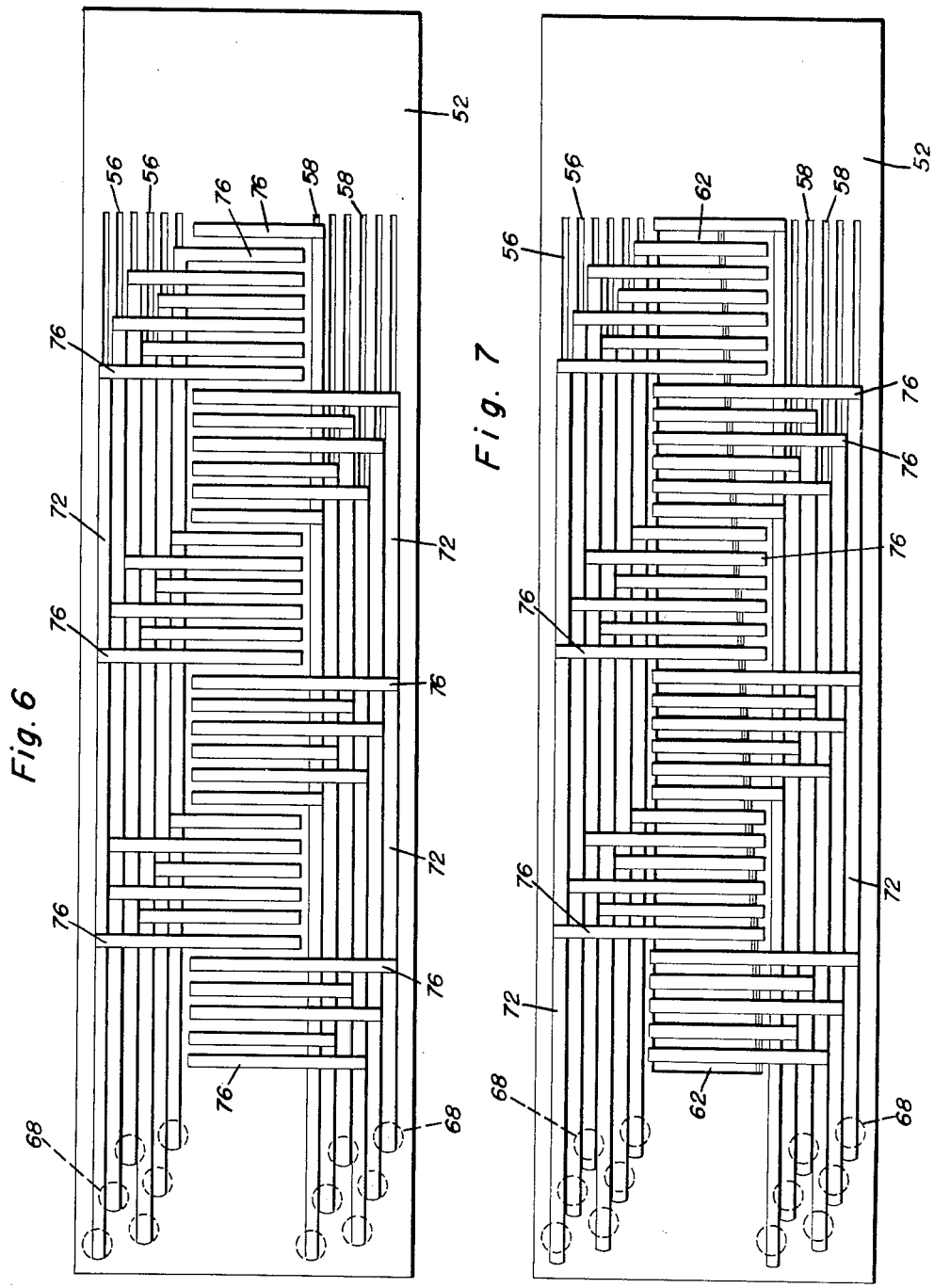

May 8, 1956

O. J. OLSON 2,744,434

MULTIPURPOSE POCKET-SIZE HARMONICA
WITH SELECTIVE KEY-CHANGE MEANS

Filed Sept. 8, 1952

Olaf J. Olson
INVENTOR.

BY *(signatures)*
Attorneys

Olaf J. Olson
INVENTOR.

May 8, 1956
O. J. OLSON
2,744,434
MULTIPURPOSE POCKET-SIZE HARMONICA
WITH SELECTIVE KEY-CHANGE MEANS
Filed Sept. 8, 1952
6 Sheets-Sheet 6
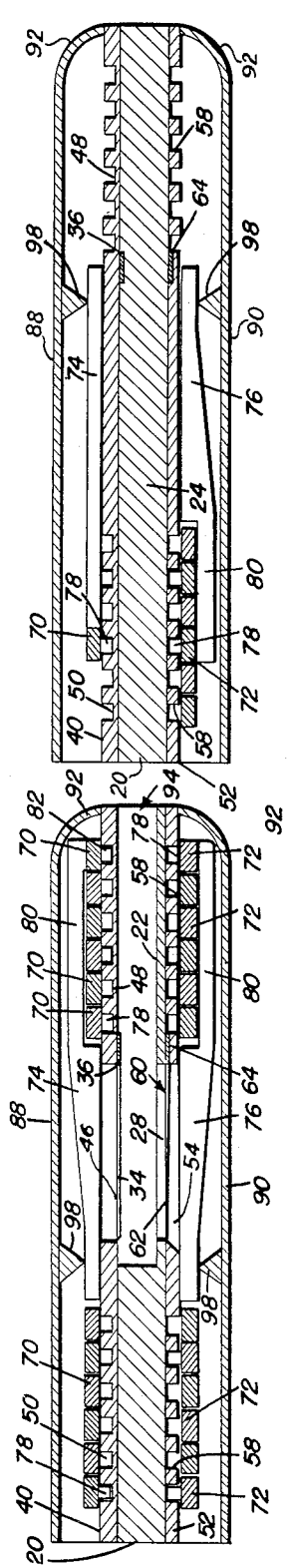
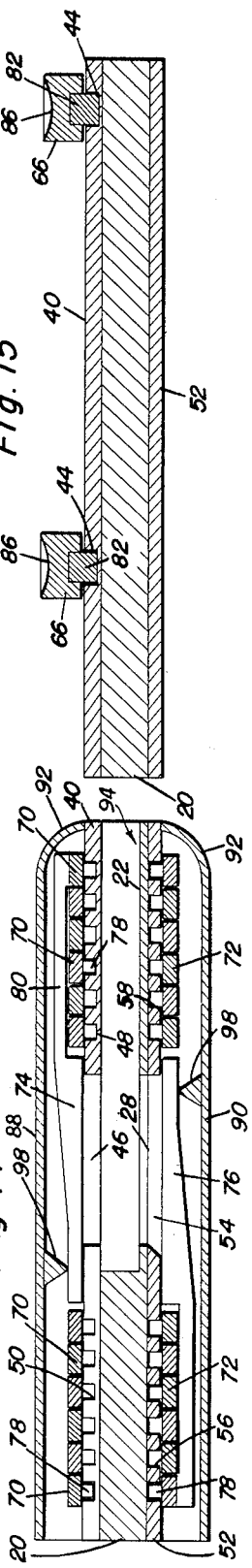
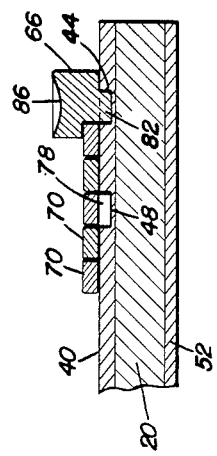
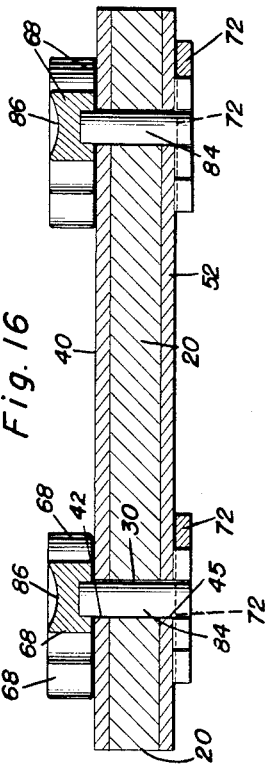
Olaf J. Olson
INVENTOR.
BY *Clarence A. O'Brien*
*and Harvey B. Jacobson*
Attorneys

United States Patent Office 2,744,434
Patented May 8, 1956

2,744,434

MULTIPURPOSE POCKET-SIZE HARMONICA WITH SELECTIVE KEY-CHANGE MEANS

Olaf J. Olson, San Pedro, Calif.

Application September 8, 1952, Serial No. 308,417

9 Claims. (Cl. 84—377)

This invention relates to mouth organs and harmonicas, generally classified, but has particular reference to certain new and useful improvements therein which, when adopted, will serve to provide an augmented pocket-size reed organ in which manufacturers, teachers, students and professional users will find their respective requirements and needs fully met and successfully available.

It is a matter of common knowledge that the conventional harmonica is quite limited in nature and, generally speaking, is capable of producing but two chords (tonic and dominant-ninth). Also, each harmonica is pitched to play in but a single key, for example, the key of C major. Others are made to play in the key of G and so on. This means that a capable performer desiring to resort to the use of the full gamut or range of keys would have to own twelve different harmonicas. In the instant matter, and using harmonica principles as a basis of accomplishment, a single augmented harmonica (pocket-size) is provided which is capable of utilizing all harmonies possible in a twelve-tone chromatic octave and thus offers selective facilities of outstanding importance and significance.

With this improved construction, one may have a complete eight-tone major scale in any one of twelve keys in the twelve-tone chromatic system. This feature alone makes this instrument the equivalent of twelve harmonicas, each in a different key. Nor do the possibilities end here. Any manner of harmony or discord may be had as rapidly as the skill of the performer will permit. In addition to the twelve major scales, twenty-four minor scales also may be played, as well as five-tone, six-tone, eight-tone, and other scale structures. The only limitations are the skill of the performer and restrictions of harmony to the octave, or perhaps to a ninth or tenth, depending on the mouth span of the performer.

Briefly summarized, this unique harmonica may be played in any key in the same manner as one plays any conventional harmonica. For example, by manipulating the correct stop-key, any accidental occurring in the melody may be played. In addition, rapid chromatic, diatonic, whole-tone, and five-tone glissandos, and all harmonies, including polytonal and atonal, may be performed on this instrument. When all stop-keys are in "closed" positions the instrument is silent. When all stop-keys are in "open" positions, the chromatic scale may be played by either blowing or drawing, or, alternatively blowing and drawing. The desired musical key must be selected by choosing and manually moving correct stop-keys inward.

Key grouping, as will be hereinafter explicitly covered, is similar to that long established in keyboard instruments, and because each individual tone in the chromatic scale is controlled at will, it affords a greater selectivity than that reached in the prior art. For example, one of the chords often used at the end of a popular arrangement includes the sixth scale step in a major tonic, thus: In the key of C we would then have the tones C, E, G and A as a cadence chord. The same would apply throughout all the keys, major or minor mode.

Identical chords, or single tones, may be had by either blowing or drawing. Complete melodies and/or harmonies may be played by merely blowing and manipulating stop-keys. Whole-tone scales may be played in rapid glissando by simply setting the stop-keys to either blow or draw the desired scale, a facility not reached in the prior art. The entire chromatic scale may be played, with ease, as one dissonant chord, a feat that is difficult even on a keyboard instrument, and not achieved in the prior art.

This improved instrument contains every harmonic possibility that may be had in the twelve-tone chromatic system. It also contains every possibility of dissonance that can be produced from the twelve half-steps as we know them.

All polychords may be produced, thus affording modern polytonal harmonies; e. g., the triad on G and the triad on D may be selected from the same set of stop-keys thus: G, B, and D, F-sharp, and A; in which GBD is the triad on G, and DF-sharp A is the triad on D. Similarly all of Joseph Schillinger's Kaleidophone (a system of harmony exhausting all possible scales and chord combinations within a key) may be played on my herein disclosed instrument.

More specifically, the concept has to do with a pocket-size (size not to be limited) harmonica in which the user has at his disposal a complete eight-tone major scale in any selected one of twelve keys in the twelve-tone chromatic system comprising encased body means having a prescribed number of progressively graduated windcells each having correspondingly graduated reed slots and freely vibrating reeds registering with the respective slots, and manually actuable selectively operable slot opening and closing means accessibly mounted on said body means, whereby any one or all or any combination of the reeds may be rendered responsive or non-responsive depending on the key selected and wherein any accidentals which may be required are attainable during the course of playing a melody in the selected key.

Then, too, novelty is predicated on a structurally unique harmonica through the medium of which the player thereof may adjust the same preparatory to playing in any one of the twelve major scales, twenty-four minor scales, five-tone, six-tone, eight-tone combinations of tones comprising a protectively encased centrally arranged body having the required number and graduated range of open ended wind cells, slots for said cells and reeds functioning in the respective slots, and means for controlling the flow of air through the slots.

What is more, novelty has to do with a structurally distinct harmonica characterized by an encased centrally located body, said body having at least twelve cells each with diametrically opposite top and bottom reed slots and graduated reeds mounted in said slots permitting the playing of a twelve-tone chromatic scale, slide bars mounted on the top and bottom sides of said body, individual stop-buttons carried by said slide bars, and lateral shutters carried by said bars and arranged to selectively open and close predetermined slots permitting the player to play an uninterrupted chromatic scale, a major scale and/or to control accidental sharps and flats at will in conjunction with the major scale, wherein said cells, slots and reeds are multiplied to produce three chromatic scales and said slide bars, buttons and shutters are likewise multiplied and prearranged to duplicate the aforementioned results in respect to each chromatic scale.

Features and advantages in addition to those briefly touched upon will, of course, be more readily apparent from the following description and the accompanying drawings.

In the accompanying drawings wherein like numerals are employed to designate like parts throughout the same:

Figure 1 is a top plan view of a multipurpose harmonica with selective key-change means constructed in accordance with the principles of the present invention, this being the side which is "up" when the harmonica is being played;

Figure 2 is a longitudinal sectional view showing most of the essential parts;

Figure 3 is an enlarged fragmentary sectional and elevational view showing the laminated body structure, covers with stabilizing ribs and showing the push-button means at the left based on Figures 1 and 2;

Figure 6 is an elevational or plan view of the lower reed plate (sometimes referred to as a shield) and showing all of the stops of the draw reeds closed;

Figure 7 is a corresponding plan view with all stops or slots open;

Figure 12 is an enlarged cross-section on the line 12—12 of Figure 2 looking in the direction of the arrows;

Figures 13 and 14 are similar enlarged sections on the lines 13—13 and 14—14, respectively, of Figure 2 looking in the direction of the arrows;

Figures 15, 16 and 17, are similar enlarged cross-sections, with parts removed, taken on the lines 15—15, 16—16 and 17—17, respectively, of Figure 1.

By way of introduction to the detailed description it will be evident, of course, that the essential aspect of the invention has to do with the principle and structural means which is manually regulable and arranged for controlling the flow of air at the reed slots in respect to both the blow reeds and the draw reeds.

The instrument may be constructed entirely of plastics, metal, plastics and metal, wood and metal, although plastic material is presently thought to be the desirable kind. It will be evident as the description unfolds that the invention has to do with a reed bank or an assembly of reeds which is to be molded, stamped or milled in the case of metal, in one piece, and in tune, thus minimizing the number of elements necessary to be handled by the manufacturer as well as the instrument repairman.

It will be clear too, that the slides which are push-button controlled are held in place by friction brought to bear on the slide bars by means of contact ribs in the cover sections of the enclosing case or casing. It will be noticed that there are no springs or catches. The stop bars slide back and forth when a light longitudinal force or pressure is applied thereto through the medium of the push-buttons.

It will be further evident that the "body structure or means" broadly construed is preferably a laminated arrangement and that, briefly, there is a cellular body at the center and top and bottom reed carrying plates, cover sections and reed assemblies with the push-buttons properly mounted for sliding and operating slide bars which, in turn, actuate and thus open and close the shutters or slot blanking stops.

Figure 4:
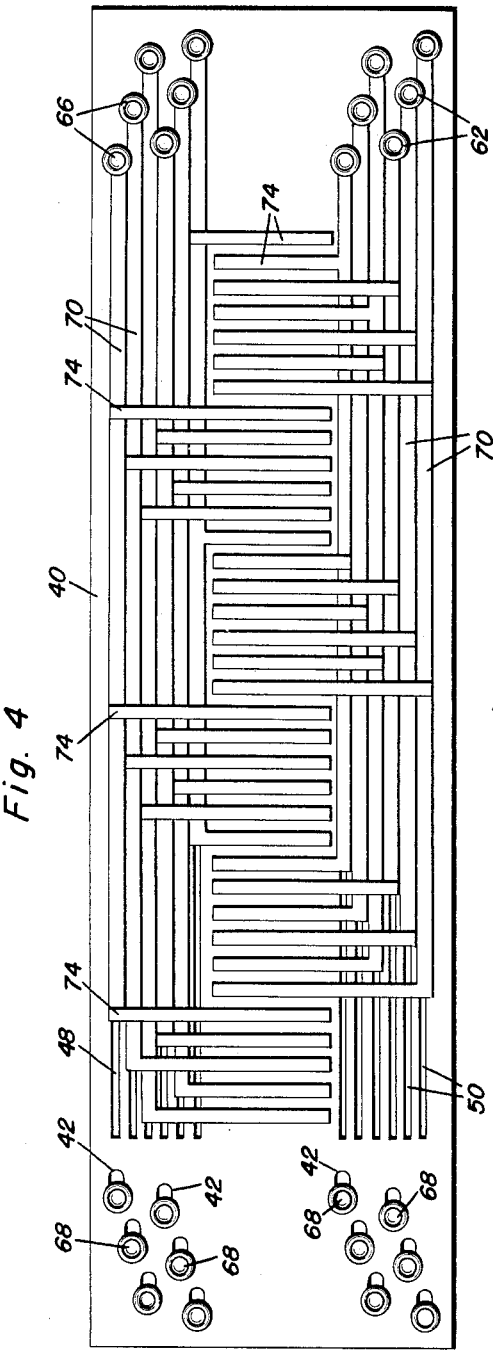
Figure 4 is a top plan view of the upper reed mounting plate showing the upper push-button operated slide bars with the shutters in position whereby all blow reeds are closed.
Figure 5:
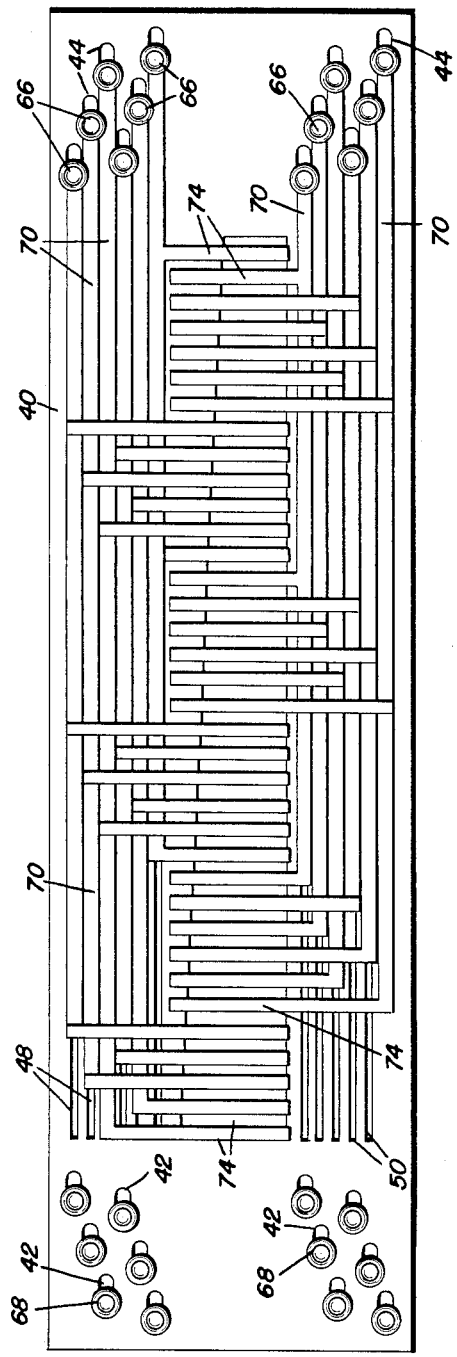
Figure 5 is a similar view with the push-buttons pushed from right to left and showing all of the stops or shutters open.
Figure 8:
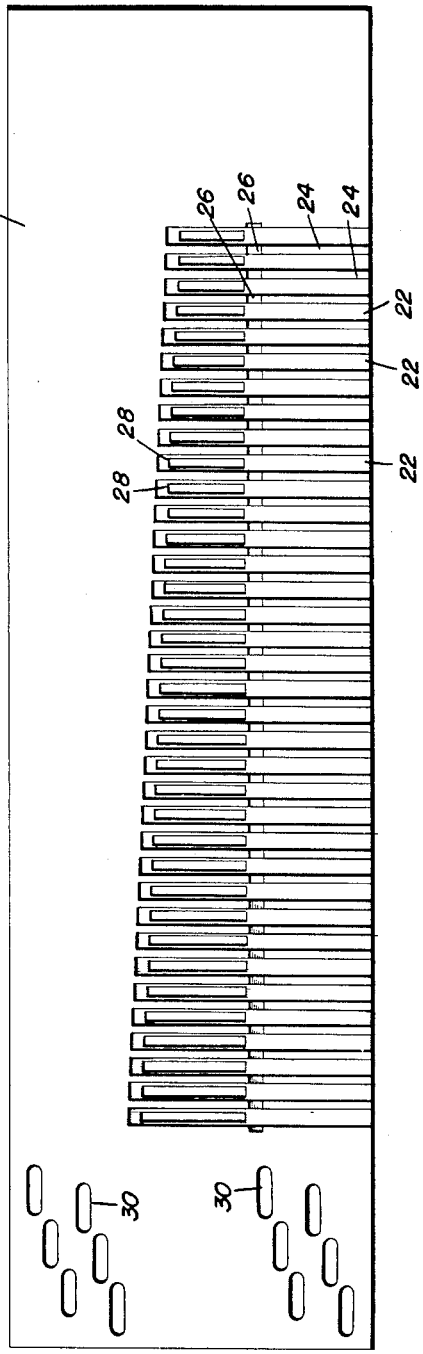
Figure 8 is a plan view of the body means, the central lamination, also referred to as the comb, observing the slotted cells from the top.

The body member, sometimes called a cellular block, is denoted by the numeral 20. This is also referred to in the trade as a comb and usually comprises a series of longitudinally spaced teeth which function as dividers and define the cells between themselves. In the instant situation, the cells are denoted by the numerals 22—22 and these cells open through the mouth edge of the instrument to serve as blow holes. The cells are actually rabbetted or molded as shown in Figure 8 and the dividers 24 between the passages which form the cells are provided with accommodation recesses 26—26 which serve a purpose to be hereinafter described. The reed slots, which are properly graduated, are denoted by the numerals 28—28. At the left-hand end portion of the block or body a plurality of check slots 30—30 are provided and these extend clear through the body and serve a purpose to be hereinafter described.

Figure 9:
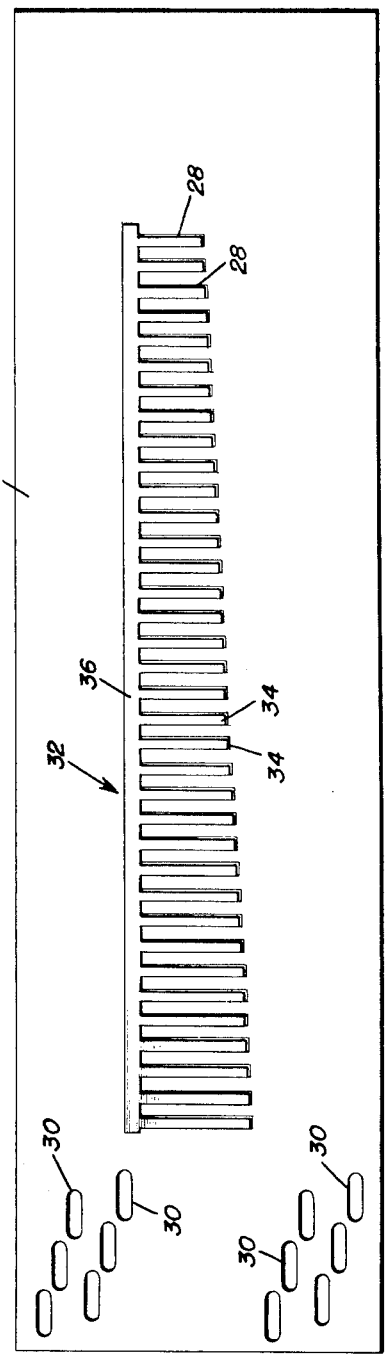
Figure 9 is a view of the same observing the construction from the bottom.

As clear in Figure 9, the reed bank or reed assembly is denoted by the numeral 32 and comprises a plurality of reeds 34 interconnected by a spine or connecting element 36. This unit 32 is precision made and is of one-piece construction and preferably made of commercial plastics of an appropriate grade to simplify manufacture, assembly and repair. These are the blow reeds and they, of course, register with the slots with which they are adapted to cooperate.

It will be seen that the top or upper ply, the so-called top reed plate, corresponds in size with the body and this is denoted by the numeral 40 and this is provided with check slots 42—42 at the left-hand end which register with the slots 30—30 and is provided with stop check shallow grooves 44—44 at the opposite end.

Figure 10:
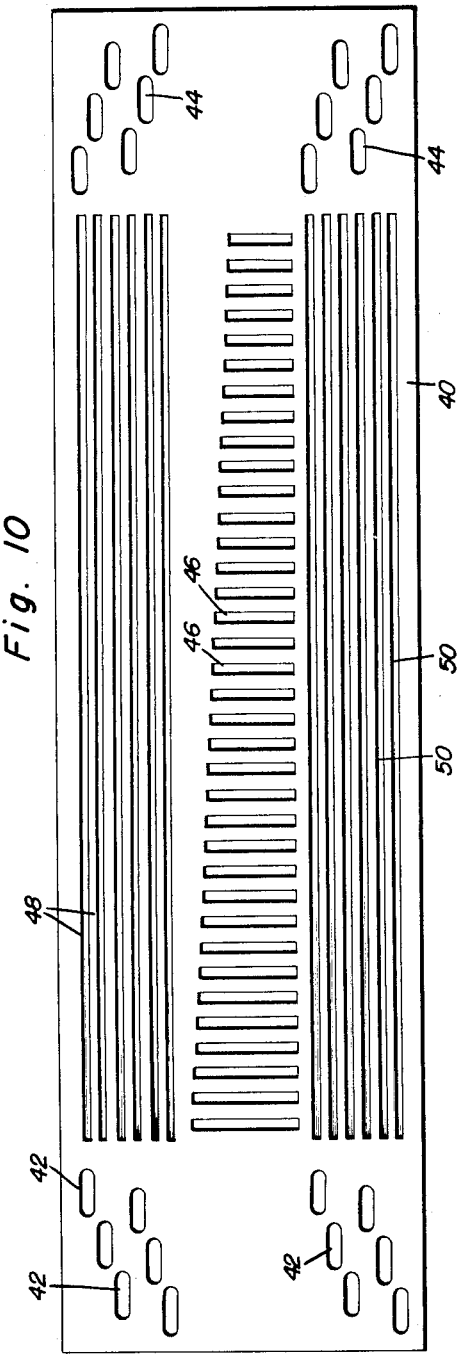
Figure 10 is a top plan view of the upper reed plate with the push-button controlled slide bars and shutters omitted.
Figure 11:
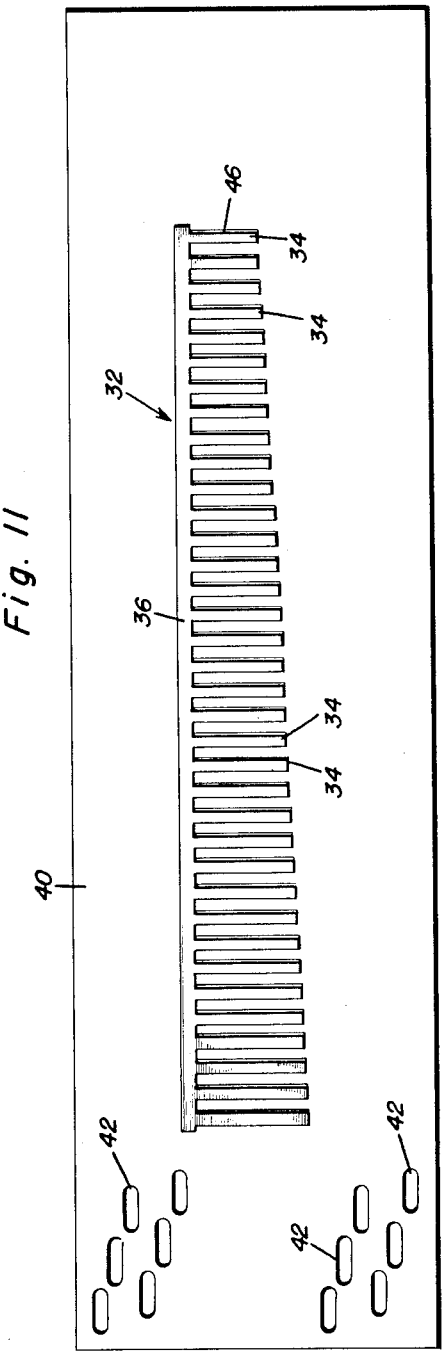
Figure 11 is a bottom plan view of said upper reed plate.

It will also be observed in Figure 10 that this reed carrier or mounting plate is provided with reed slots properly graduated, said slots being denoted by the numerals 46—46. Above the slots 46, as shown in Figure 10 are six longitudinal rabbetted grooves which serve as keyways 48. Similar grooves or keyways 50 are provided below the slots. These grooves line-up properly with the features 42 and 44 and are twelve in number, that is, there are six grooves above and six below the reed slots 46.

The complemental lower reed plate is denoted by the numeral 52 and this is the third one of the laminations and it corresponds in area with the two laminations already described. It is provided with reed slots 54 which are bevelled at the back edge to prevent the draw reed from operating as a blow reed, and which register with the other reed slots and wind cells and it is also provided with keyways which here take the form of slots 56 and 58, there being six above the reed slots and six below the reed slots, and these serve in the same capacity as the grooves or keyways 48 and 50 in the upper reed plate 40. These several laminations are components 20, 40, and 52 are appropriately secured together and the reed assembly or bank 60, comprising reeds 62 and a connecting bar 64 (Figure 12), is interposed between the lower reed plate 52 and the adjacent bottom side of the cellular body 20.

As before stated, the concept contemplates the provision of valving or shutter means wherein an individual shutter is provided for each blow reed and its slot and another shutter provided for each draw reed and its slot. As before explained, there are actually thirty-six reeds in the top bank or assembly (Figure 9) and thirty-six in the bottom one and a corresponding number of slots and cells (Figure 8). There are twenty-four push-buttons for operating the slides and shutters and these are arranged so that all of them operate against the top side of the body structure. To accomplish this satisfactorily, there are twelve buttons to the right as seen in Figure 1 and twelve buttons to the left. All buttons at the right (blow stops) are denoted by the numerals 66—66 and those to the left (draw stops) by the numerals 68—68. As is evident from Figure 1, these buttons serve to make it possible for the user to select and adjust to the desired key in which the performance is to be rendered. By this is meant that there is a button (Figure 1) for the key of C-natural, the next one for D-natural, one for E, one for F, another for E-flat or D-sharp and this same set-up or arrangement is duplicated for the lower button control slides at the left, that is, the buttons 68 which are identified by the letters C, D, E, F, E-flat and so on. Each push-button unit or means is the same in construction and each comprises a slide bar with lateral fingers thereon. The fingers form the valves or shutters for the slots and reeds. For convenience and distinction the six slide bars of each group in the over-all top arrangement of twelve are denoted by the numerals 70—70. The twelve slide bars which correspond and are arranged on the bottom, but which perform likewise, are denoted by the numerals 72(—72). The lateral shutters or fingers which are arranged in multiples of three are denoted at the top by the numerals 74 and at the bottom by the numerals 76. The respective slide bars have guides 78 which are keyed to reciprocate back and forth in their respective keyways. Some of the shutters are coplanar with their slide bars as shown, for example, in Figure 13. Others have to be offset and shaped up properly in cross-section as denoted at 80 and these are referred to as bridge portions in that they bridge over the adjacent slide bars so as not to interfere with the operation of the latter. The push-buttons 66 at the top (Figures 1 and 15) have lugs 82 which operate in a limited manner in the check slots or grooves 44 which are provided therefor as shown, for example, in Figures 15 and 17. The push-buttons 68 at the left are provided with similar lugs which extend through the aligned check slots 30, 42 and 45 as shown for example in Figure 16 and connect with and operate the cooperating slide bars 72. The last-named lugs are denoted by the numerals 84 and are, of course, longer than the lugs 82 as shown in the comparisons in Figures 15, 16 and 17. All of the push-buttons have recesses in their top surfaces, as at 86 (Figures 15–17), and these provide convenient finger seats.

The top cover plate is denoted by the numeral 88 and the bottom cover plate by the numeral 90. The forward edge portions are provided with curved lip flanges 92—92 cooperating with the so-called blow holes 94. The transverse ends of the cover are laterally bent to provide suitably arranged end-flanges 96—96. On the interior surfaces of the covers are longitudinal and transverse contact ribs denoted respectively by the numerals 98 and 100. These are suitably arranged to engage the coacting slide bars and they are V-shaped in cross-section and minimum pressure-contact is had due to the fact that the vertices only of the ribs have retentive contact with the inwardly and outwardly movable slide bars 70 and 72.

It will be noticed that the comb or main body lamination 20 has the penetrating check slots 30—30 at the left-hand end only and that the mortises or beveled seats 26—26 (Figure 8) serve to accommodate the coacting spine portion of the companion reed bank.

It is reiterated that the entire set, bank or assembly of reeds is molded, milled to true pitch using either plastic or metal and is made in one piece to facilitate assembling. The inner surface of the upper reed plate is designed to fit into the reed bank mortise in the comb; the outer surface of the lower reed plate, the anchored edge or tie strip, is arranged to fit into the reed bank mortises in the reed plate shield, thus lying between the lower side of the comb and the lower reed plate or shield.

If plastic push-buttons or keys are used on metal stop checks, they will have to be fastened with pins or rivets. a hole of convenient size must then be drilled through the stop check and stop key to accommodate the rivet or pin of adequate strength. Because of these additional operations, an all plastic construction is desired.

The function of the contact ribs on the cover is to hold the slide bars 70 and 72 in contact with the reed plates with sufficient friction to prevent movement of reed stop or shutter without the application of light force directed longitudinally by means of the push-buttons or stop keys.

All plastic construction is recommended. However, if durable, non-warping plastic reed material that will withstand a moderate blast cannot be obtained, metal reeds are indicated. All metal construction is possible, but dimensions of various parts should then be reduced for reasons of weight and ease of manipulation. Molding, of course, is indicated for plastic construction, and milling for metal construction. A combination of materials would, of course, entail operations under both processes. Since this harmonica is designed for durable service in the hands of accomplished musicians, as well as in the hands of beginners, it should be of sufficient sturdiness to be reliable at all times, and under all reasonable conditions.

It is to be kept in mind that the thumbs are used only to support the instrument, the fingers are used to manipulate the buttons 66 and 68. Placing 3rd finger of right hand on concave surface of the upper F-sharp stop-key, the latter is moved toward upper cover propelling stop-bar and three reed stops, all kept in contact with upper reed plate by transverse contact ribs and lateral contact ribs in upper cover and directed by stop-bar guides operating in guide grooves until halted with the result that three reed slots are uncovered, permitting the free vibration of three F-sharp reeds when air is blown into wind chambers. Likewise, placing 3rd finger of left hand on concave surface of lower F-sharp stop-key, the latter may be moved toward upper cover propelling stop-bar and three reed stops, all kept in contact with reed plate shield by transverse contact ribs and lateral contact ribs in lower cover and directed by stop-bar guides operating in guide groove until halted by lower stop check operating in lower check slot with the result that three reed slots 37 would be uncovered, permitting the free vibration of three F-sharp reeds 38 when air is drawn out of wind chambers.

It should be noted that, although distribution of longitudinal and lateral contact ribs is irregular, a very slight displacement of any one of lateral contact ribs, would render mechanism controlled by stop-keys entirely useless and thus defeat the purpose of the construction. Foot elements along rear edge of both covers are also irregularly spaced. Since transverse contact ribs are placed at points of maximum support, foot elements are spaced to supplement that support. However, symmetry is observed as much as possible under these circumstances.

In actual practice, the respective groups of twelve buttons at the respective transverse ends of the body member, all project above the top of the instrument where they are accessible for expedient actuation by the fingers of the adjacent left and right hand. Each group of twelve is divided into a forward set of six and a rearward set of six. It is preferred that at the right in Figure 1, the buttons which represent the natural keys C, D, E, and F will be white and those representing the sharps and flats or so-called accidentals will be black. It follows therefore that in each group of twelve buttons there will be five black buttons or "keys" and seven white buttons or "keys" bearing a systematic and coordinating relationship to the white and black keys on certain standard keyboard instruments. This means that one who is already familiar with the keyboard of a piano, organ, piano-accordion will appreciate this systematic arrangement of "keys" on this harmonica. Also, those who study this unique harmonica will become familiar with the arrangement of the "miniature keyboard" and this added information will naturally come in handy in respect to learning the keyboard of the organ and piano, etc.

Emphasis is also attached in this matter to the structural simplicity of the slide bars, the individual top and bottom bars 70 and 70 with the individual knob-like buttons or keys at the respective outer ends with all of the buttons on the top side. Stress is also placed on the contact ribs in the cover section by which the entire key change means is held in place. Further attention is invited to the inherent feature of the construction which arises from the absolute selectivity of the key change means and which enables the performer to exclude or include any single tone or any desired number of tones.

It will be clear that in order to play a chord one places the mouth over the blow holes and either blows or draws wind in relation to the reeds of the instrument, this in a well known manner. To play a single tone, place the tongue against the front of the instrument, covering all holes except one on the right of the tongue and blow or draw. To play the scale in C-major, begin with the sixth draw hole from the left and blow or draw as the case may be. To select a key, manually move the desired push-button or buttons 66 from right to left or the buttons 68 from left to right, that is, in relation to the drawings and this will accomplish the desired key change result. It will be noticed in Figure 1 that the various push buttons have been lettered to show what or which tone each button represents. Each button, of course, controls a single slide bar and each slide bar is provided with three shutters, one for each twelve step chromatic scale. In other words, when one wants to play in the key of C he moves the buttons C, D and E on the right from right to left. This operates the shutters in relation to the top bank of reeds. He also pushes the buttons G, B, D, F, and A on the left from left to right and this operates the shutters for the lower reed bank. It is possible to close up all slots and cover all reeds or to select certain slots and certain reeds depending on the key which is to be played in or the requirement for use of accidentals in any key which is being utilized at the time.

It is thought that persons skilled in the art to which the invention relates will be able to obtain a clear understanding of the invention after considering the description in connection with the drawings. Therefore, a more lengthy description is regarded as unnecessary.

Minor changes in shape, size and arrangement of details coming within the field of invention claimed may be resorted to in actual practice, if desired.

Having described the invention, what is claimed as new is:

1. A harmonica comprising an encased centrally located body, said body having at least twelve wind cells each with diametrically opposite top and bottom reed slots and graduated reeds mounted in said slots permitting the playing of a twelve-tone chromatic scale, individual relatively narrow slide bars mounted on the top and bottom sides of said body, individual stop-buttons carried by the outer ends of said slide bars, and individual corresponingly narrow lateral shutters carried by each bar and arranged to selectively open and close predetermined reed slots, permitting the player to play an uninterrupted chromatic scale, a major scale and to control accidental sharps and flats at will in conjunction with the major scale.

2. A harmonica comprising a laminated body structure, the center lamination having flat top and bottom surfaces and wind cells, said cells being open at their outer ends and having top and bottom reed slots, the top lamination being a reed anchoring plate and having attached blow reeds registering with the top slots, the bottom lamination being a reed shield, said latter lamination having reed slots, draw reeds interposed between the bottom lamination and bottom surface of said center lamination and registering with the adjacent respective slots, and top and bottom cover plates marginally attached to the top and bottom laminations and encasing the reeds and slots, said top and bottom laminations having longitudinal grooves functioning as keyways, slide bars having keys shiftably keyed in said keyways, lateral shutters carried by said slide bars and optionally registerable with the reed slots and serving to cover the reeds to render same non-responsive, and rib means carried by the interior surfaces of said cover plates and clampingly contacting the cooperating slide bars and constituting the means for assembling and operatively maintaining the latter and shutters in their intended functioning positions.

3. A harmonica comprising a laminated body structure, the center lamination having flat top and bottom surfaces and wind cells, said cells being open at their outer ends and having top and bottom reed slots, the top lamination being a reed anchoring plate and having attached blow reeds registering with the top slots, the bottom lamination being a reed shield, said latter lamination having draw reeds interposed between the bottom lamination and bottom surface of said center lamination and registering with the adjacent respective slots, and top and bottom cover plates marginally attached to the top and bottom laminations and encasing the reeds and slots, said top and bottom laminations having longitudinal grooves functioning as keyways, slide bars having keys shiftably keyed in said keyways, lateral shutters carried by said slide bars and optionally registerable with the reed slots and serving to cover the reeds to render same non-responsive, and push-buttons secured to the outer ends of the respective slide bars for operating the latter.

4. A harmonica embodying a slotted reed-equipped laminated cellular body structure with cover plates, and push-button controlled individual valving means for all slots, wherein there are thirty-six cells, thirty-six blow reeds tuned to produce three chromatic scales, a corresponding number of draw reeds, one shutter for each blow reed and its slot, one shutter for each draw reed and its slot, twelve top slide bars each with its own push button, and twelve bottom slide bars, each with its own push button, each slide bar having three shutters secured thereto, all shutters being of a size slightly greater than the area of the slot which is intended to be covered thereby, all of said buttons being arranged for handy, accessible, finger-actuated operation and projecting outwardly and beyond the top side of the body structure, there being a group of twelve blow reed controlling buttons at one transverse end of the structure and a second group of twelve draw reed controlling buttons at the other transverse end of said structure.

5. A harmonica comprising a laminated body structure, the center lamination having flat top and bottom surfaces and wind cells, said cells being open at their outer ends and having top and bottom reed slots, the top lamination being a reed anchoring plate and having attached blow reeds registering with the top slots, the bottom lamination being a reed shield, said latter lamination having draw reeds interposed between the bottom lamination and bottom surface of said center lamination and registering with the adjacent respective slots, and top and bottom cover plates attached marginally to the marginal edge portions of the top and bottom laminations and encasing the reeds and slots, said top and bottom laminations having longitudinal grooves opening toward said cover plates and functioning as keyways, individual slide bars having keys shiftably keyed in their respective keyways, lateral shutters carried by said slide bars and optionally registerable with the reed slots and serving to cover the reeds to render same non-responsive, a push-button secured to the outer end of each slide bar for operating the latter, the interior surfaces of said cover plates having longitudinal and transverse V-shaped ribs integrated therewith distributively located relative to predetermined cooperating slide bars, the vertices of said ribs contacting adjacent predetermined slide bars and constituting the essential means for maintaining said slide bars in assembled operating positions in said keyways.

6. A pocket-size harmonica through the medium of which the player thereof may adjust the same preparatory to playing in any one of the twelve major scales, twenty-four minor scales, five-tone, six-tone, eight-tone combinations of tones comprising a protectively encased centrally arranged body having the required number and graduated range of open-ended wind cells, slots for said cells and reeds functioning in the respective slots, and means for controlling the flow of air through the slots, said means being selectively regulable so that all of the slots may be opened, all of the slots completely closed; or, some of the slots closed while others are left open, said means being mounted atop said body and accessibly located at the respective transverse ends of the body, making it possible to support the harmonica with the thumbs and to operate said means with the fingers of either one or both hands, said means embodying a shutter for each slot, a plurality of finger-buttons accessibly and slidably mounted atop the body and a plurality of operating connections between the respective finger-buttons and predetermined shutters.

7. The structure defined in claim 6, wherein each operating connection is in the form of a longitudinally extending bar, the latter being slidably keyed on said body and joined with its particular finger-button and at least one shutter, the latter being at right angles to the axis of the bar.

8. A pocket-size harmonica through the medium of which the player thereof may adjust the same preparatory to playing in any one of the twelve major scales, twenty-four minor scales, five-tone, six-tone, eight-tone combinations of tones comprising a protectively encased centrally arranged body having the required number and graduated range of open-ended wind cells, slots for said cells and reeds functioning in the respective slots, and means for controlling the flow of air through the slots, said means being selectively regulable so that all of the slots may be opened, all of the slots completely closed; or, some of the slots closed while others are left open, said means being mounted atop said body and accessibly located at the respective transverse ends of the body, making it possible to support the harmonica with the thumbs and to operate said means with the fingers of either one or both hands, said means embodying a shutter for each slot, a plurality of finger-buttons accessibly and slidably mounted atop the body and a plurality of operating connections between the respective finger-buttons and predetermined shutters, there being selector and operating buttons for each key in which the user desires to play the harmonica, twenty-four buttons, altogether characterized by a group of twelve blow reed controlling buttons at one transverse end of the structure and a second group of twelve draw reed controlling buttons at the other transverse end of said structure, each group of twelve buttons embodying five black buttons representing sharps and flats and seven white buttons arranged in customary scale sequence and comparable with the black and white keys in a chromatic scale on a piano keyboard or the like.

9. A harmonica embodying a slotted reed-equipped laminated cellular body structure with cover plates, and push-button controlled individual valving means for all slots, wherein there are thirty-six cells, thirty-six blow reeds tuned to produce three chromatic scales, a corresponding number of draw reeds, one shutter for each blow reed and its slot, one shutter for each draw reed and its slot, twelve top slide bars, each with its own push button, and twelve bottom slide bars, each with its own push button, each slide bar having three shutters secured thereto, all shutters being of a size slightly greater than the area of the slot which is intended to be covered thereby, all of said buttons being arranged for handy, accessible, finger-actuated operation and projecting outwardly and beyond the top side of the body structure, there being a group of twelve blow reed controlling buttons at one transverse end of the structure and a second group of twelve draw reed controlling buttons at the other transverse end of said structure, the buttons in each group of twelve buttons being systematically located and arranged in close-spaced relation relative to each other, each button being identified by a key-designated letter-symbol, such as C natural, D natural, C-sharp, D-flat, and so on, the natural keys being white and the accidental sharp and flat keys being black, whereby to thus informatively tie-in with the conventional sequence of white and black keys on a piano or an equivalent black and white keyboard.

References Cited in the file of this patent

UNITED STATES PATENTS

| | | |
|---|---|---|
| 581,313 | Smith | Apr. 27, 1897 |
| 2,179,993 | Davies | Nov. 14, 1939 |
| 2,192,983 | Moore | Mar. 12, 1940 |
| 2,459,184 | Ruffino | Jan. 18, 1949 |
| 2,473,210 | Magnus | June 14, 1949 |
| 2,478,963 | Bibus | Aug. 16, 1949 |
| 2,496,511 | Abbott | Feb. 7, 1950 |

FOREIGN PATENTS

| | | |
|---|---|---|
| 103,237 | Switzerland | Feb. 1, 1924 |
| 231,094 | Great Britain | Mar. 26, 1925 |